Oct. 25, 1955     F. W. MEREDITH     2,721,713
POWER-ASSISTED CONTROL SURFACES FOR DIRIGIBLE CRAFT
Filed July 18, 1949     2 Sheets-Sheet 1
FIG.1.
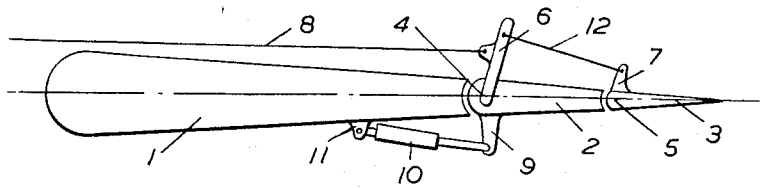
FIG.2.
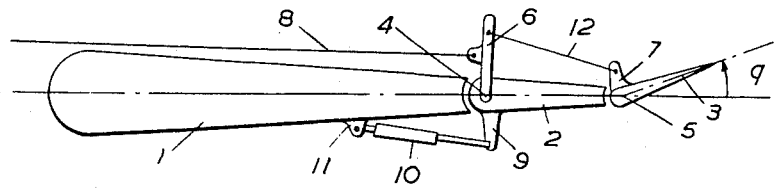
FIG.3.
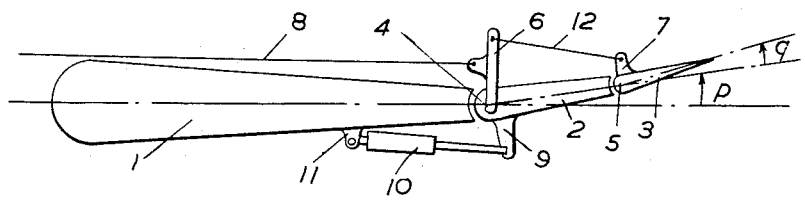
FIG.4.
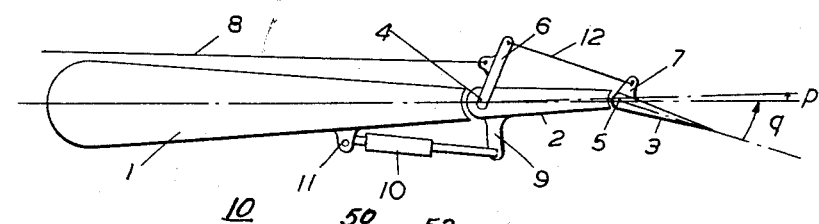
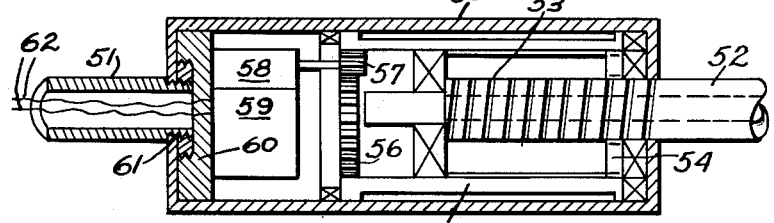
FIG.7.
Inventor
FREDERICK WILLIAM MEREDITH.
By Moore & Hall
Attorneys Inventor
FREDERICK WILLIAM MEREDITH
By *[signature]*
Attorneys

United States Patent Office 2,721,713
Patented Oct. 25, 1955

2,721,713

POWER-ASSISTED CONTROL SURFACES FOR DIRIGIBLE CRAFT

Frederick William Meredith, London, England, assignor to S. Smith & Sons (England) Limited, London, England, a British company Application July 18, 1949, Serial No. 105,410

Claims priority, application Great Britain July 23, 1948

5 Claims. (Cl. 244—83)

This invention relates to control surfaces for dirigible craft and means for the actuation of such surfaces, in particular to the provision of means for power-assisted operation of such surfaces.

It has previously been proposed to provide servo-systems for the operation of such control surfaces wherein strict proportionality is obtained between control surface movement and the movement of the object controlling the control surface, e. g., in the case of an aircraft proportionality is maintained between the movement of the rudder and that of the rudder bar. Such a system is comparatively complicated, and entails the continuous energisation of the servo system; also it is found that for such corrective movements of the control surfaces as are required in normal flight (in the case of an aircraft) manual power, or the power available from a comparatively low-power automatic pilot, is sufficient.

It is the object of the present invention to provide simplified means for the operation of control surfaces for dirigible craft wherein large control moments on the craft are provided by a power-actuated surface while small moments, such as the corrective moments required in normal straight flight, are provided by a surface actuated either manually or under the control of an automatic pilot of limited power.

According to the present invention there is provided in combination a power-assisted control assemblage for a dirigible craft, the combination of a main control surface, irreversible power-actuating means to actuate said main control surface, a light control surface, differential actuating means controlling the position of said light control surface, inputs to said differential actuating means being constituted by the displacement of the main control surface and by the displacement of control means of limited power, the position of the light control surface thus being a function of both the main control surface displacement and the displacement of the control means of limited power, and means to control the energization of the irreversible power actuating means in accordance with displacement of the light control surface, the differential actuating means being so constructed that actuation of the main control surface while the displacement of the control means of limited power is maintained constant does not result in any change in the total control moment exerted on the craft by the main and light control surfaces.

According to a further feature of the present invention the motor or motors actuating the main control surface are started when the displacement of the light control surface exceeds a prescribed limit and are stopped when the displacement of the light control surface is below a further prescribed limit (which may be the same as the first-mentioned limit). Alternatively the rate of movement of the main control surface may be made proportional to the displacement of the light control surface.

By "irreversible gearing" we mean gearing which is capable of transmitting motion from the motor for either direction of motion of the motor, but is not capable of transmitting motion from the driven object to the motor, i. e., we mean gearing analogous to a conventional screw jack. The motors and irreversible gearing may conveniently be arranged as disclosed in the specification of U. S. application Serial No. 94,886, now U. S. Patent No. 2,607,025, issued August 12, 1952.

An embodiment of the invention, in which it is applied to the control of the rudder of an aircraft will now be described with reference to the accompanying drawings of which:

Figure 1 represents a section through the fin and rudder when no turning moment is being exerted on the aircraft by the rudder and both main and light rudders are central with respect to the aircraft;

Figure 2 represents a similar section when the yaw turning moment is applied solely by displacement of the light surface;

Figure 3 represents a similar section when turning moment is applied by displacement of both main and light rudders;

Figure 4 represents a similar section when reversed displacements of the two surfaces result in zero yawing moment;

Figure 7 is a fragmentary sectional view of one form of the irreversible connection 10 of Figures 1–4.

Figure 5:
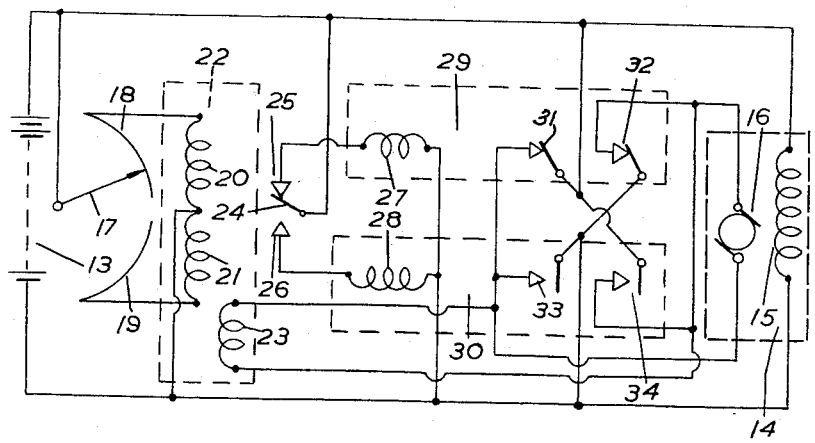
Figure 5 is a circuit diagram of the control for the motor for the main rudder.

Referring to the Figures 1 to 4 the fin 1 has pivoted to it along axis 4 the main rudder 2. The main rudder has pivoted to it along axis 5 a light rudder 3. The position of the main rudder with respect to the fin is determined by electric motor driven screw jack actuator represented by 10 and described in the specification of U. S. application Serial No. 94,886 attached to a bracket 11 on the fin 1 and operating on an arm 9 attached to the main rudder 2.

The position of the light rudder 3 is determined by a control rod 8, of limited power attached to an arm 6 pivoted about axis 4 (and not attached to the main rudder). Movement of rod 8 is controlled manually or by an automatic pilot, such as that described in the specification of U. S. patent applications Serial Nos. 655,684 and 658,614, now U. S. Patent 2,607,550, issued August 19, 1952, and U. S. Patent 2,611,559, issued September 23, 1952, respectively. A further rod 12 attached between arm 6 and a further arm 7 secured to the light rudder 3. In the position shown in Figure 1, i. e., with both rudders central, the arms 6 and 7 are both at right-angles to the further control rod 12.

Suppose the lengths of the arms 6 and 7 from pivot to the point of attachment of the control rod 12 are $a$ and $b$ respectively; suppose the displacement of the control rod from the position shown in Figure 1 is $x$ and suppose that the angle of rotation of the main rudder with respect to the fin from the position shown in Figure 1 is $p$ while that of the light rudder with respect to the main rudder is $q$. Then, to a first approximation:

$$x = K\,(aq + bp)$$

K being a constant.

Thus if the control rod 8 were held fixed and the motor ran, the angle through which the light rudder would be turned would be opposite in direction and proportional to the angle through which the main rudder had turned.

The arms 6 and 7 together with the link 12 thus constitute a differential actuating mechanism, the displacement $q$ of the light rudder being a function of both the main rudder displacement $p$ and the control rod displacement $x$.

Suppose the total moment exerted on the craft by both main and light rudders is N. Then, again to a first approximation, $$N = lq + mp$$

where $l$ and $m$ are constants depending upon the characteristics of the main and light rudders.

If $$\frac{l}{m} = \frac{a}{b} \text{ clearly } N = kx$$

for some constant $k$ where $$k = \frac{l}{Ka}$$

According to the present invention $$m = \frac{b}{a} \cdot l$$

or $$\frac{b}{a} = \frac{m}{l}$$

The main rudder 2 is driven by the motor and irreversible mechanism 10 in such a manner that it exerts a control moment on the craft in the same direction as that exerted by the light rudders prior to the starting of motor 10. Further, if the condition $$\frac{b}{a} = \frac{m}{l}$$

is fulfilled, as it is according to the invention, the moment on the aircraft due to the movement of the main rudder 2 is equal to the reversed moment on the craft due to the reversed movement of the light rudder 3 resulting from the movement of the main rudder 2 if the control rod 8 is held stationary while the motor 10 is running.

It will be realised that a system of control according to the present invention may result in the main and light control surfaces temporarily having positions as shown in Figure 4, in which neither of the angles $p$ and $q$ is zero, while at the same time the total yawing moment on the craft is zero.

Referring to Figure 5, which illustrates a circuit for causing the motor and irreversible gear 10 to be operated whenever the magnitude of angle $q$ exceeds a predetermined value, a D. C. source, conventionally represented by battery 13 supplies the motor 14 of the motor and irreversible gear 10. The motor 14 has a constantly-excited field winding 15 and an armature 16. An insulated wiper arm 17 on the light rudder connected to one side of the D. C. supply 13 engages with one or another of the mutually insulated sectors 18, 19 on the main control surface when the displacement between main and light rudders is greater than a predetermined amount. Sectors 18 and 19 are connected respectively through opposed windings 20 and 21 of a polarised relay 22. This relay 22 has a third winding 23. The relay moving contact 24 engages with one or other of the fixed contacts 25, 26 according as to whether the energisation of the relay is in one direction or the other; and takes up a position midway between them when the energisation is zero. Contact 24 is connected to one side of the supply, while contacts 25 and 26 are connected respectively to the other side of the supply through operating coils 27 and 28 of power relays 29 and 30. Relay 29 has two sets of normally open contacts 31, 32 while relay 30 has also two sets, 33 and 34. Contacts 31 and 32 when closed connect armature 16 to the supply in one sense, while contacts 33 and 34 when closed connect it in the opposite sense. The voltage across the armature 16 is applied to coil 23 of polarised relay 22. This voltage will thus be in accordance with the motor speed.

The circuit operates as follows:

If the displacement between the main and light rudders is such as to bring arm 17 into contact with sector 18, winding 20 of polarised relay 22 is energised, winding 27 of relay 29 is energised, and the motor 14 is energised to actuate the main rudder in such a manner as to bring arm 17, to the "dead" section between sectors 18 and 19. The energisation of winding 23 is such as to oppose that of winding 20, but is normally insufficient to cause contact 24 to change over, unless the motor speed should become excessive. When arm 17 does reach the "dead" section however, winding 23 causes contact 24 to change over and make contact with contact 26. This results in reversal of the torque generated by the motor, so it slows up rapidly and the voltage across winding 23 (substantially the back E. M. F. of the motor) is rapidly reduced to zero. When the voltage across winding 23 is substantially zero, i. e. when the motor has stopped, contact 24 will take up a position midway between contacts 25 and 26 and the armature will be de-energised. It will thus be seen that when the position of substantial alignment between the main and light rudders is reached the motor 14 is rapidly brought to a standstill and overshoot prevented.

In straight flight conditions with the aircraft properly trimmed the whole of the yaw control will be exerted by the low-power actuated light rudder 3, as shown in Figure 2. If a control moment is required greater than that obtainable with angle $q$ equal to the predetermined value the switch contacts of relay 29 or relay 30 are closed when $q$ reaches this value and the motor 14 runs to reduce $q$ to less than the predetermined value, thus reducing the load on cable 8 and the torque demand on the manual control or automatic pilot. The normal control moments are then again provided by the light rudder 12. Thus if the aircraft is multi-engined and one engine fails, necessitating a steady moment from the rudder to maintain a straight course the greater part of the turning moment is supplied by the main rudder 2, which is held in position by the motor and irreversible drive 10, and, because of the irreversible drive, the power demanded from the motor 14 will be zero. If the turning moment demand ceases the motor will be caused to run in the opposite direction by the relative motion between rudders 2 and 3 when 3 is operated to maintain the aircraft on course. Thus the motors and drive 10 will only operate intermittently and it will be possible to use comparatively small motors at a rating which would not be possible if they were required to be energised continuously.

Figure 6:
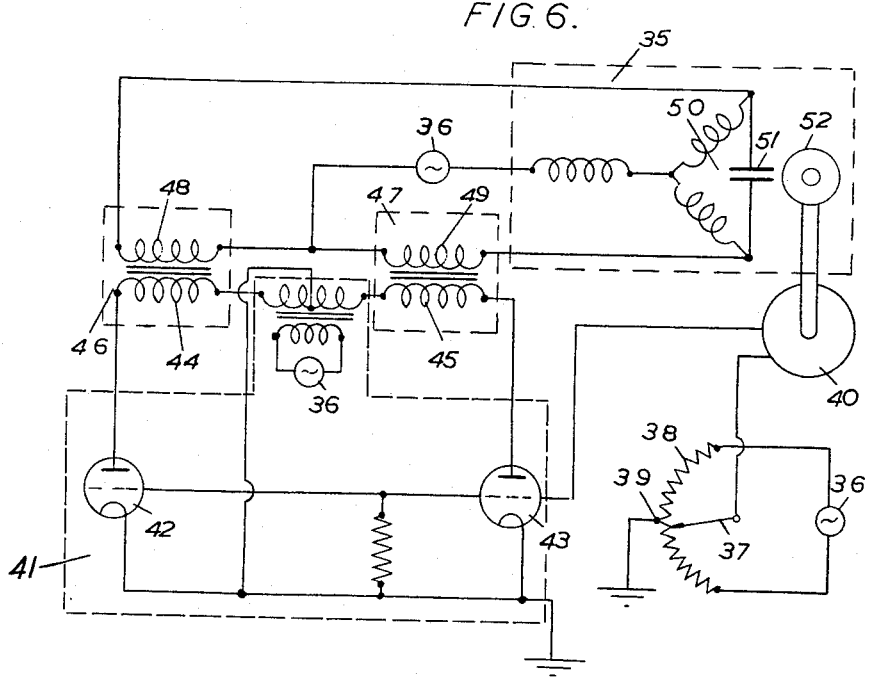
Figure 6 is a circuit diagram of an alternate control circuit for the motor for the main rudder.

Alternatively an electric signal generator may be provided giving a signal proportional to angle $q$, and a control system may be provided for the actuating motors to ensure that the rate of change of angle $p$ is proportional to angle $q$. The control circuit for this form of the invention is illustrated in Figure 6, in which the servo-motor 35 actuating the main rudder 2 runs at a speed substantially proportional to the displacement between the main and light rudders 2, 3. An A. C. source 36 supplies both the power and signal voltages. An insulated wiper arm 37 carried on the light rudder engages with the arcuate potentiometer resistor 38 mounted on the main rudder. This resistor 38 is connected across the source 36 so that a voltage is obtained between arm 37 and the earthed centre-tap 39 of resistor 38. This voltage is proportional to the displacement between the main and light rudders and is in phase or antiphase with the voltage of source 36, depending upon the direction of the displacement. This voltage is applied with a voltage from generator 40 which is in phase or antiphase with that of source 36 and is proportional to the rate of movement of the main rudder, to the input of a phase discriminative amplifier 41 comprising two valves 42, 43 fed in push-pull from source 36. The amplifier 41 illustrated is of conventional type and, as is well known, the difference between the direct currents in the anode circuits of valves 42, 43 is in accordance with the input applied to the grids of the valves, one or the other being larger according to the phase of the input with respect to that of the output of source 36. The two anode currents pass respectively through control windings 44 and 45 of saturable reactors or transductors 46 and 47. The power windings 48 and 49 of these transductors are connected respectively between one terminal of source 36 and one or other of two of the terminals of the 3-phase wound stator 50 of the servo-motor 35. A phase-splitting condenser 51 is connected between these two terminals, while the third stator terminal is connected to the other side of source 36. The rotor 52 of the motor drives the main rudder 2 through suitable irreversible gearing, and has mounted on its shaft the rotor of generator 40.

The motor is conveniently of the hysteresis type described in British patent specifications Nos. 576,248 and 576,249, while the generator is of the type described in British patent specification No. 576,351 and gives an output having an amplitude proportional to the rate at which the motor 35 turns.

It will be seen that when an input signal is applied to amplifier 41, motor 35 will rotate in one direction or the other. The signal from generator 40 is arranged to oppose that from potentiometer resistor 38, and the servo system operates in the usual manner to reduce the amplifier input substantially to zero, the motor rotating in a direction to reduce the displacement of arm 37. The main rudder is driven in a direction to reduce the displacement between main and light rudders 2, 3 to zero and at a speed proportional to the displacement.

The irreversible mechanism designated generally by 10 in Figs. 1–4 may take any one of a member of well known forms and is essentially a helix or worm with a small lead and an actuating nut threaded thereon. The pitch of the helix is sufficiently small that no matter what longitudinal force is applied to the nut or worm the coefficient of friction is large enough to prevent rotation. Only rotation of the nut or worm will produce relative movement.

In Fig. 7 the device 10 takes the form of a housing 50 and two projecting tubular members 51 and 52 pivoted respectively to mountings 11 and 9, but otherwise held against rotation about a transverse axis. Member 52 is threaded as at 53 with a small pitch helix on which is fitted nut 54 carried by sleeve 55 mounted on suitable bearings within housing 50. Nut 54 is firmly mounted adjacent the outer end of sleeve 55.

The inner end of sleeve 55 may have an internal gear 56 mating with pinion 57 of gear reducer 58 driven by servomotor 59. Motor 59 and gear reducer 58 are mounted on block 60 threaded to member 51 and locked in place by an abutting shoulder 61. Wires 62 running within tubular member 51 supply power to motor 57. It will be seen that rotation of motor 59 rotates nut 54 and causes member 52 to move longitudinally to actuate surface 2, but longitudinal force applied to member 52 merely jams it against nut 54 until motor 59 is energized. It will be understood that the gear train represented by gear reducer 58, pinion 57, internal gear 56, nut 54 and helix 53 represents a very large mechanical advantage so that motor 59 can be quite small.

While the invention has been described with reference to an aircraft rudder it will be appreciated that it is applicable to any control surface for an air or water craft. It will also be appreciated that it is not necessary for the light control surface to be pivoted to the main control surface.

I claim:

1. In a power-assisted control surface assemblage for a dirigible craft, the combination of a main control surface, a first input comprising irreversible power-actuating means to actuate said main control surface, a light control surface having a pivotal mounting carried by said main control surface adjacent its trailing edge, differential actuating means controlling the position of said light control surface comprising said main control surface, a first arm means pivoted on fixed aircraft structure, a second arm means having a shorter effective kinematic length than said first arm means fastened to and movable with said light control surface and linkage means connecting the two arm means for relative movement, a second input of limited power comprising connection means attached to said first arm means, said inputs to said differential actuating means being constituted by the displacement of the main control surface and by the displacement of said control means of limited power, the position of the light control surface thus being a function of both the main control surface displacement and the displacement of the control means of limited power, and means to control the energization of the irreversible power actuating means in accordance with displacement of the light control surface, whereby movement of the control means produces a close approximation of the demanded effect and any small control movements to bring the dirigible craft exactly into trim are provided by the light control surface, free from hunting and related instability.

2. The combination claimed in claim 1 wherein the irreversible power actuating means are energized when the displacement of the light control surface relative to the main control surface exceeds a certain limit and are de-energized when the displacement is within said limit.

3. The combination claimed in claim 2 wherein the irreversible power actuating means comprise an electric motor and there are also provided a pair of mutually insulated conducting sectors mounted on one of said control surfaces, a conducting arm mounted on the other of said control surfaces and adapted to engage with one or other of said sectors, an electric motor control circuit for causing rotation of said motor in one direction or the other depending on whether said arm contacts one or the other of said sectors, the motor being stationary when the arm is between said sectors and said motor control circuit is open.

4. The combination claimed in claim 1 wherein the energization of the power actuating means is controlled to produce actuation of the main control surface at a rate proportional to the displacement of the light control surface relative to the main control surface.

5. The combination set forth in claim 4, said irreversible power actuating means having a motor as a part thereof, an arcuate potentiometer resistor mounted on one of said control surfaces, a potentiometer arm mounted on the other said control surfaces, whereby an electric signal is derived between said arm and a point on said resistor proportional to the displacement between said light and main control surfaces and means for controlling the speed of said motor by said electric signal.

References Cited in the file of this patent

UNITED STATES PATENTS

| | | |
|---|---|---|
| 2,277,378 | Wells | Mar. 24, 1942 |
| 2,351,307 | Vorech | June 13, 1944 |
| 2,568,719 | Curry | Sept. 25, 1951 |